United States Patent [19]

Eltze

[11] 4,396,100
[45] Aug. 2, 1983

[54] FRICTION LINING FOR MULTIPLE-DISK CLUTCHES OR MULTIPLE-DISK BRAKES

[75] Inventor: Georg Eltze, Stuttgart, Fed. Rep. of Germany

[73] Assignee: Daimler-Benz Aktiengesellschaft, Fed. Rep. of Germany

[21] Appl. No.: 216,481

[22] Filed: Dec. 15, 1980

[30] Foreign Application Priority Data

Dec. 14, 1979 [DE] Fed. Rep. of Germany ....... 2950349

[51] Int. Cl.³ ..................... F16D 13/64; F16D 13/72; F16D 13/74
[52] U.S. Cl. ................................ 192/70.12; 188/71.6; 188/264 D; 192/70.14; 192/107 R; 192/113 B
[58] Field of Search ............. 192/70.12, 70.14, 107 R, 192/113 B; 188/71.6, 264 B, 264 D, 264 E

[56] References Cited

U.S. PATENT DOCUMENTS

| 2,690,248 | 9/1954 | McDowall | 192/113 B |
| 3,048,250 | 8/1962 | Kershner | 192/113 B X |
| 3,094,194 | 6/1963 | Kershner | 192/113 B X |
| 3,493,087 | 2/1970 | Freeman et al. | 192/70.14 X |
| 3,695,407 | 10/1972 | Peery | 192/70.14 X |
| 4,011,930 | 3/1977 | Coons et al. | 192/113 B |
| 4,260,047 | 4/1981 | Nels | 192/70.14 |

FOREIGN PATENT DOCUMENTS

| 2331315 | 1/1975 | Fed. Rep. of Germany ... 192/113 B |
| 2523815 | 5/1976 | Fed. Rep. of Germany . |
| 796255 | 6/1958 | United Kingdom ............ 192/113 B |

Primary Examiner—Rodney H. Bonck
Attorney, Agent, or Firm—Craig & Burns

[57] ABSTRACT

A friction lining for a multiple disk clutch or a multiple disk brake, with grooves extending in a direction from a radially inner lining edge to a radially outer lining edge. Individual ones of these grooves exhibit pronounced rectangular or orthogonal transistion areas between the groove and a surface of the friction lining with the remaining grooves exhibiting non-rectangular transistion areas of the groove edges to the friction surface of the friction lining. A plurality of grooves provided non-rectangular transitional areas extend linearly and are not connected to the grooves having the rectangular transitional areas. At least one groove having a rectangular transitional area and being open at least toward the outer lining edge is disposed between two circumferentially adjacent or neighboring grooves having a non-rectangular transitional area.

11 Claims, 3 Drawing Figures

FRICTION LINING FOR MULTIPLE-DISK CLUTCHES OR MULTIPLE-DISK BRAKES

The present invention relates to a lining and, more particularly, to a friction lining for a multiple-disk clutch or multiple-disk brake, the lining being provided with grooves extending in a direction from a radially inward edge of the lining to a radially outward edge of the lining, with the individual grooves including a pronounced rectangular or orthogonal transition and the remaining grooves having non-rectangular transitions from the edges of the grooves into the friction surface.

A frictional lining of the aforementioned type is proposed in, for example, Offenlegungsschrift No. 2,331,315 wherein individual radial distributed grooves are uniformly spread over a friction surface. The distributor grooves, sealed off with respect to a radially inward as well as with respect to a radially outward edge of the friction lining, are in communication with a central circumferential groove supplied by the pressurized cooling fluid through axial bores provided in the friction disk. The distributed grooves and a circumferential groove each having a large cross-section with rectangular transition of the rims of the groove into the frictional surface. The entire frictional surface is provided with additional cooling grooves extending spirally and in close proximity to one another, with each of the cooling grooves having a narrow wedge-shaped cross-section so that the transitions of the rims of the cooling grooves into the friction surface form an obtuse angle. The spiral shaped cooling grooves are in communication with a circumferential groove and with the distributor grooves.

The purpose behind the above-noted proposed configuration of the friction lining is to attain an improved cooling effect with the use of a flat disk clutch or brake of a transmission to provide longer dragging times and, thus, a smoother shifting operation.

Additionally, the friction linings in a change-speed clutch or brakes of an automatic change-speed transmission must be provided with grooves for cooling. To avoid a lubricating wedge effect during a shifting operation, the grooves must, in such a situation, be constructed so as to be sharp-edged and/or have a pronounced right angled transitional area between the grooves and the friction lining. Due to the high viscosity of a cold lubricant or oil in the transmission, the lubricant-wedging effect leads to a build-up in a frictional moment which is delayed in time and exhibits its adverse effect at a beginning of a shifting operation with a racing of the engine or at least with a grab or engagement which is too soft. This is especially true in cases of disks without corrugations, for example, planar disks; however, grooves with pronouncedly rectangular transition areas also cause high residual moments in an opened condition of the brake or clutch.

In order to reduce the above-noted residual moments, it would actually be possible to insert corrugated or wavy spring rings between the individual friction disks which would bring the friction disks out of engagement when the clutch operating force has been turned off; however, such release springs result in an increase of the adjusting stroke of the operating piston acting on the clutch or brake. The increase in the adjusting stroke of the operating piston is disadvantageous if it is desired to attain brief shifting times and an exact control of the shifting operation of the change-speed transmission.

The aim underlying the present invention essentially resides in providing a friction lining for a multi-disk clutch or multiple-disk brake which avoids the occurrence of high residual moments upon a termination of a shifting operation of a change speed transmission without impairing the shifting quality of the transmission.

In accordance with advantageous features of the present invention, the grooves with the non-rectangular transitions between the grooves and the friction lining surface extend linearly and also are not connected to the grooves having rectangular transitions. At least one groove having pronouncedly rectangular or orthogonal transitions is disposed between two circumferentially adjacent or neighboring grooves having the non-rectangular transitions. The at least one groove is opened toward at least the outer edge of the friction lining.

Advantageously, the grooves provided with the non-rectangular transition areas are closed toward the outer edge of the friction lining, and such grooves extend radially outwardly.

In a friction lining in accordance with the above-noted features of the present invention, the grooves with the non-rectangular transitional portions serve for generating a hydrodynamic lubricant wedge effect which causes the disks to lift-off from one another after a termination of the applying of the operating force at the onset of a relative rotation. However, in order to maintain this lubricant wedged effect at a minimum, relatively few grooves with the lubricant wedge effect will suitably be provided as compared with the number of cooling grooves. The grooves with the lubricant wedge effect may, for example, exhibit a configuration which is inclined to be radial, in order to maintain the lubricant wedge effect within limits.

In Offenlegungsschrift No. 2,523,815, it is proposed to terminate the grooves provided in the friction lining at a specific spacing from the inner rim of the annular friction lining. The purpose of this configuration is to ensure the existence of a skid resistance with friction linings manufactured of an asbestos material or the like, which friction linings are molded under the effects of heat and pressure.

By virtue of the closing of the grooves with the non-rectangular transitional areas toward the outer edge of the friction lining, the cooling fluid remains accommodated in such grooves so that a lubricant wedge effect may be created.

Advantageously, in accordance with further features of the present invention, the at least one groove having the rectangular transitional area extends in parallel to a radial groove between a radial groove with the rectangular transitional area and a circumferentially neighboring groove having non-rectangular transitional areas.

In accordance with still further features of the present invention, the groove provided with the non-rectangular transitional area lies between two grooves with rectangular transitional areas, with the last-mentioned grooves being proximate to each other in a circumferential direction and also extending at right angles to each other.

In accordance with further features of the present invention, at least four grooves with non-rectangular transitional areas are arranged in a uniform distribution about the friction lining.

Accordingly, it is an object of the present invention to provide a friction lining for multi-disk clutches or multiple-disk brakes which avoids, by simple means, shortcomings and disadvantages encountered in the prior art.

Another object of the present invention resides in providing a friction lining for multi-disk clutches or multiple-disk brakes when automatic change-speed transmission which enables the attainment of brief shifting times and an exact control over a shifting operation of the transmission.

Yet another object of the present invention resides in providing a friction lining for multiple-disk clutches or multiple-disk brakes for automatic change-speed transmissions which avoids the occurrences of high residual moments upon a termination of a shifting operation.

A further object of the present invention resides in providing a friction lining for multiple-disk clutches or multiple-disk brakes which is simple in construction and therefore relatively inexpensive to manufacture.

A still further object of the present invention resides in providing a friction lining for multiple-disk clutch or multiple-disk brakes which functions reliably under all operating conditions.

These and other objects, features, and advantages of the present invention will become more apparent from the following description when taken in connection with the accompanying drawings which show, for the purposes of illustration only, one embodiment in accordance with the present invention, and wherein.

Figure 1:
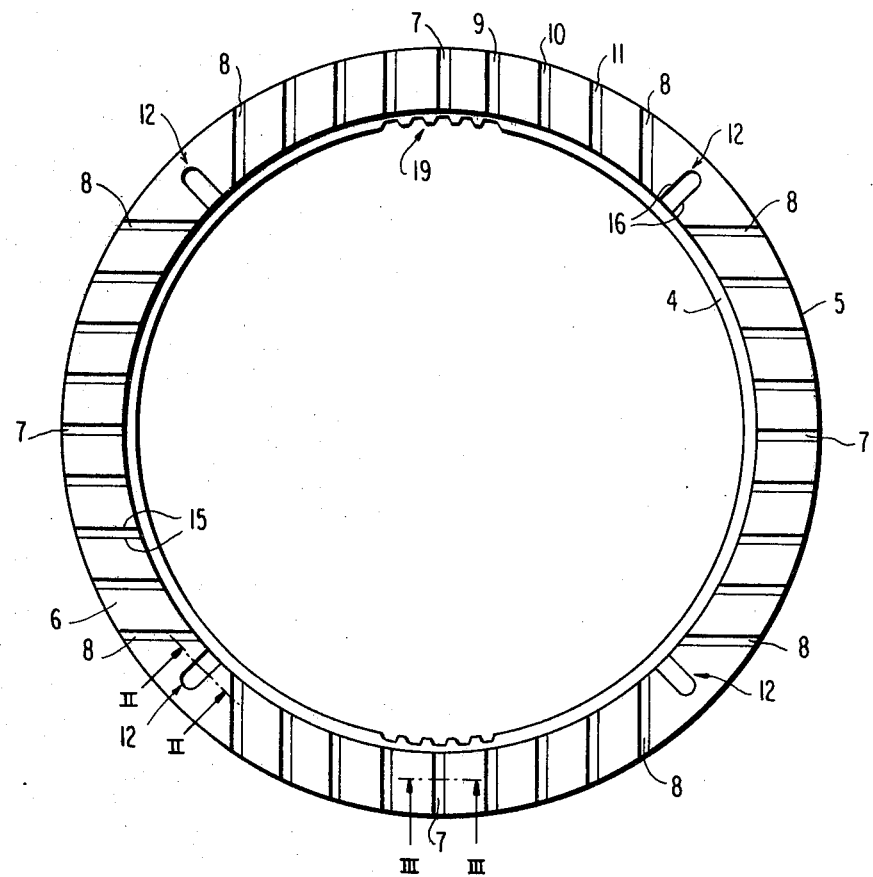
FIG. 1 is a lateral view of a friction disk provided with a friction lining in accordance with the present invention.
Figure 2:
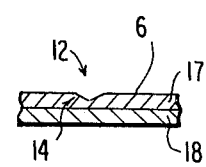
FIG. 2 is a cross-sectional view taken along the line II—II in FIG. 1.

Referring now to the drawings wherein like reference numerals are used and the various views to designate like parts and, more particularly, to FIGS. 1 and 2, according to these figures, a friction disk assembly is provided which includes a disk 18 having a friction lining 17 provided on one side thereof. The disk 18 is provided with a plurality of wedge-shaped serrations generally designated by the reference numeral 19 along an inner circumference thereof for enabling a non-rotational but axially displaceable arrangement of the disk 18 on a disk carrier (not shown). The friction lining 17 is provided with four grooves 12 which are uniformly distributed about a circumference thereof. The grooves 12 are closed-off with respect to an outer lining edge 5.

As shown most clearly in FIG. 2, the grooves 12 have a wedge-shaped cross-sectional so as to form along their respective groove edges 16 an obtuse-angled transitional area 14 between the groove 12 and friction surface 6. There additional radial grooves 7 are disposed between the grooves 12. The radial extending grooves 7 are opened toward the outer lining edge 5 as well as toward the inner lining edge 4.

Additional grooves 8, 9, 10 and 11, are provided and disposed in parallel to the radial grooves 7. The additional grooves 8–11 are disposed between each radial continuous groove 7 and the discontinuous groove 12 proximate to a peripheral extension of each groove 7.

Figure 3:
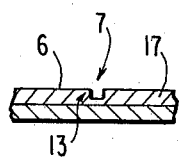
FIG. 3 is cross-sectional view taken along the line III—III in FIG. 1.

As shown most clearly in FIG. 3, the continuous grooves 7 as well as the continuous grooves 8, 9 and 10 have a rectangular cross-sectional configuration so that transitional areas of edges 15 of the respective grooves into the friction surface 6 are pronouncedly rectangular, that is, are sharp edged.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described, but intend to cover all such modifications as are encompassed by the scope of the appended claims.

I claim:

1. Friction lining for one of a multiple-disk clutch or a multiple-disk brake, the friction lining comprising a plurality of first grooves radially extending from a radially inner lining edge to a radially outer lining edge of the friction lining, each of said first grooves being provided with a pronounced orthogonal transition area between the upper edge of the groove and a surface of the friction lining, a plurality of second grooves are provided, each of the second grooves are provided with a non-rectangular transitional area between an upper edge of the groove and the surface of the friction lining, each of the second grooves extend linearly and are unconnected with the first grooves, and at least one groove having an orthogonal transistional area between the grooves and the surface of the friction lining is disposed between two circumferentially adjacent second grooves, said at least one groove is open at least toward the outer lining edge of the friction lining.

2. The friction lining according to claim 1, wherein the plurality of second grooves are closed toward the outer lining edge of the friction lining.

3. The friction lining according to claim 1, wherein the plurality of second grooves extend radially.

4. The friction lining according to claim 3, wherein the at least one groove extends in parallel to one of the first grooves and is disposed between said one of the first grooves and a second groove circumferentially adjacent to said one of said first grooves.

5. The friction lining according to claim 4, wherein at least two grooves are provided and are disposed proximate to each other in a circumferential direction and also extend at right angles to each other, and one of the second grooves is disposed between said at least two grooves.

6. The friction lining according to claim 5, wherein four second grooves are provided and are arranged in a uniform distribution around the friction lining.

7. The friction lining according to claim 1, wherein the at least one groove extends in parallel to one of the first grooves and is disposed between said one of the first grooves and a second groove circumferentially adjacent to said one of said first groove.

8. The friction lining according to claim 1, 2, or 3, wherein at least two grooves are provided and are disposed proximate to each other in a circumferential direction and also extend at right angles to each other, and one of the second grooves is disposed between said at least two grooves.

9. The friction lining according to claims 1, 2, or 3, wherein four second grooves are provided and are arranged in a uniform distribution around the friction lining.

10. The friction lining according to claims 1, 2, or 3, wherein at least four first grooves are uniformaly distributed about a circumference of the friction lining, a plurality of grooves are disposed between circumferentially adjacent first grooves with some of said plurality of grooves extending in parallel to one of the circumferentially adjacent first grooves and the remaining grooves extending in parallel to the second one of the circumferentially adjacent first grooves.

11. The friction lining according to claim 10, wherein at least two circumferentially proximate grooves of said plurality of grooves extend at a right angle to each other, and one of the second grooves is disposed between said last mentioned grooves.

* * * * *